United States Patent [19]
Gordon

[11] Patent Number: 4,799,457
[45] Date of Patent: Jan. 24, 1989

[54] GROOMING COMB FOR PETS

[76] Inventor: Richard A. Gordon, 95 W. 3rd St., Freeport, N.Y. 11520

[21] Appl. No.: 50,098

[22] Filed: May 14, 1987

[51] Int. Cl.$^4$ .............................................. A01K 13/00
[52] U.S. Cl. ......................................... 119/92; 132/139
[58] Field of Search ................ 119/85, 86, 92, 83; 132/139, 158, 159, 11 R; 24/31 L, 44

[56] References Cited

U.S. PATENT DOCUMENTS

| | | | |
|---|---|---|---|
| 1,085,063 | 1/1914 | Prouty et al. | 119/85 |
| 1,930,977 | 10/1933 | Kirch | 119/92 |
| 2,800,879 | 7/1957 | Quick | 119/92 |
| 3,591,866 | 7/1971 | Jensen | 24/31 L |
| 4,047,504 | 9/1977 | Borba et al. | 119/92 |
| 4,290,438 | 9/1981 | Price | 132/11 R |
| 4,343,265 | 8/1982 | Belschner | 119/83 |
| 4,520,831 | 6/1985 | Schumann et al. | 132/11 R |

FOREIGN PATENT DOCUMENTS 0018912 of 1889 United Kingdom .................. 119/92

Primary Examiner—Paul J. Hirsch
Attorney, Agent, or Firm—Bauer & Schaffer

[57] ABSTRACT

A combined shredding and grooming comb formed of an elongated strip of plastic, having one edge provided with uniform V-shaped teeth and a second edge with uniformly straight shaped parallel teeth. The plastic strip terminates at each end with a handle member capable of mating and interlocking with each other to form a complete handle assembly whereby the strip may be bent into a closed loop tear-drop shape for use and whereby either set of teeth may be presented to the animal fur for shedding and combing the same.

2 Claims, 1 Drawing Sheet

U.S. Patent    Jan. 24, 1989    4,799,457
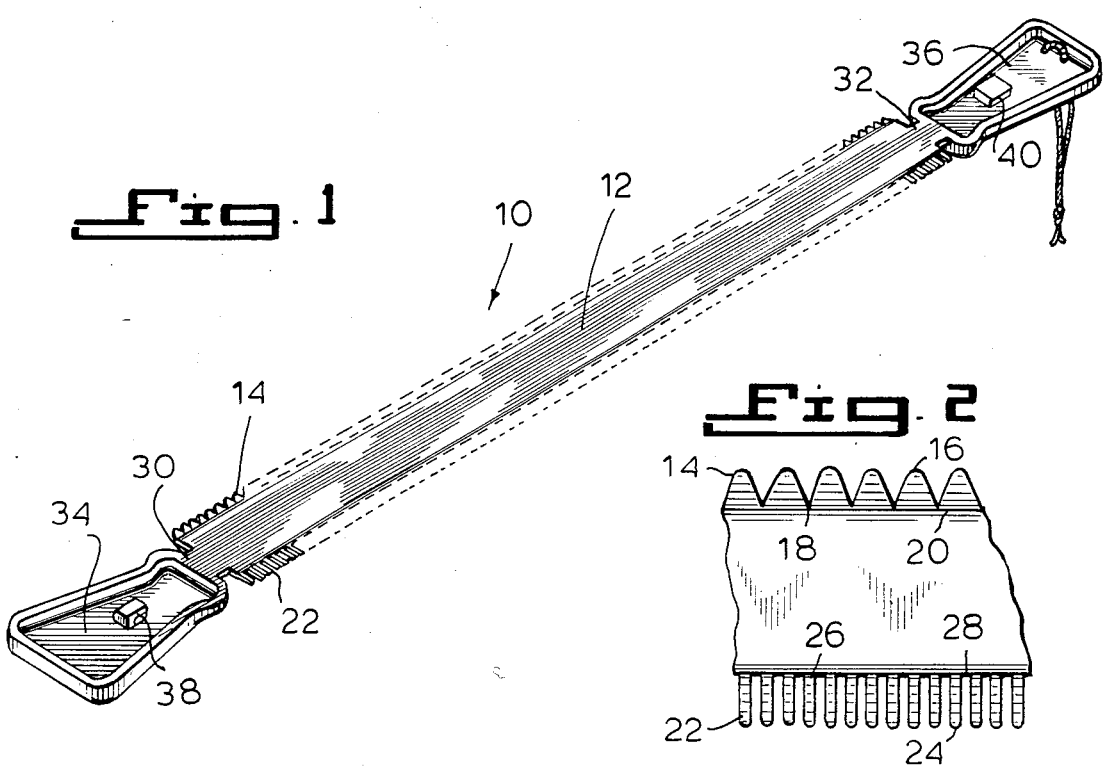
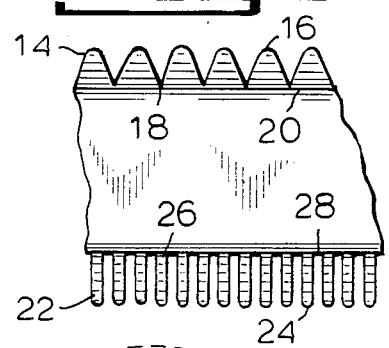
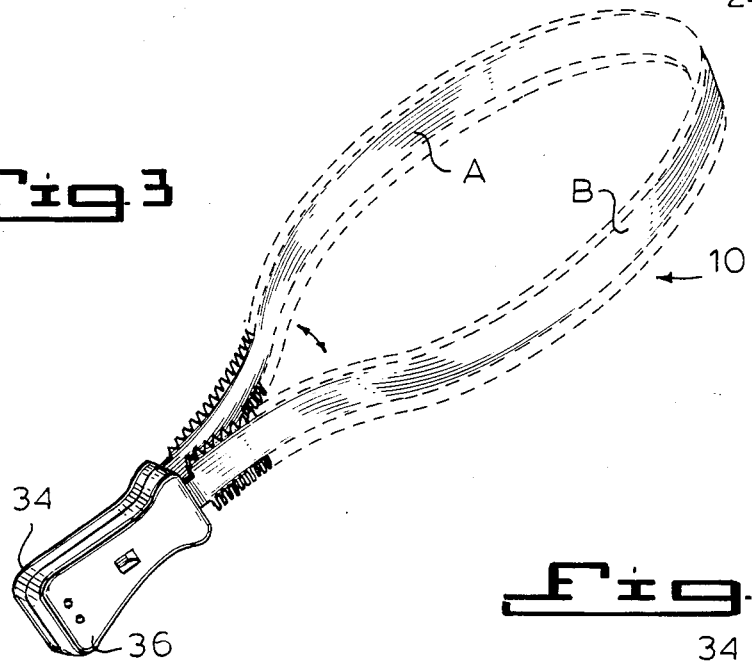
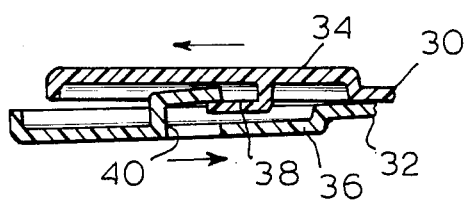

GROOMING COMB FOR PETS

BACKGROUND OF THE INVENTION

The present invention relates to a device for grooming pets and in particular, to a comb with which both shedding or stripping of loose hair and grooming of the vital hair are combined.

An early step in the process of dressing pets, particularly dogs or other animals with relatively long hair, requires the use of a shedding comb which loosens the decaying hair from the skin of the animal and carries the hair for disposal. The conventional shedding comb is formed of a strip of sheet metal, one edge of which is machined or die cut with a series of teeth by which the shedding or hair stripping operation is performed. The conventional shedding comb, is formed with irregular teeth and because of the nature of cuts by which the cutting teeth are formed, they are ragged and have rough edges. As a consequence, not only do the shedding teeth loosen the animal's hair but they tend to cut even those active and living hairs which should not be removed. Further, the metal shedding comb digs into the skin of the animal and frequently cuts and scars the animal below the level of the hair, this is extremely uncomfortable to the animal and is a major source of infection. In a subsequent step, the animal requires combing of the hair, to remove knots and tangles and to ultimately smooth the hair.

Thus, in addition to the shedding comb, a separate grooming or smoothing comb is required. The animal handler thus requires two combs, each separately used, resulting in added expense and handling.

It is an object of the present invention to provide a combing device which overcomes the disadvantages of the prior art and to provide an improved device for grooming long haired animals such as dogs.

It is an object of the present invention to provide a shedding comb which avoids pulling the hair by the roots, avoids scratching or cutting the skin of the animal and which provides for a more effective loosening and removal of the hair.

It is a further object of the present invention, to provide a shedding comb in combination with a straight grooming comb whereby grooming of the animal can be made with the same device.

It is an additional object of the present invention to provide a comb for grooming animals such as dogs, cats and the like, which will increase the speed at which such grooming is accomplished.

These objects and advantages, as well as others, will be apparent from the following disclosure.

SUMMARY OF THE INVENTION

In accordance with the present invention, a combined shedding and grooming comb is formed by providing an elongated strip of plastic, having one edge formed with uniform V-shaped teeth and a second edge with uniformly formed straight parallel teeth. The plastic strip terminates at each end with a handle member which are capable of mating and interlocking with each other to form a complete handle assembly whereby the strip may be bent into a closed loop for use and whereby either the shedding or grooming teeth may be presented to the animal.

An advantage of the present invention lies in the fact that the uniform V-shaped teeth formed of plastic material, create an electro-static action when combing the hair of the animal which tends to cause the hair to stand up, freeing the loosened hair from engagement with any strong active hair. Consequently the V-shaped teeth may more easily and effectively, remove the shedding. To further advantage, the teeth are formed to have a tip which is rounded so that the teeth cannot scratch or cut the skin of the animal. Thus complete shedding and removal of hair can be effected without pulling the hair from the roots, without cutting the hair, or without damaging the skin of the animal.

A further unexpected advantage lies in the fact that with the bendible comb and rounded teeth, two rows of shedding teeth (or alternately grooming teeth) may be simulations presented to the animal, increasing the degree to which combing is effected. The tear drop shaped comb provides a large degree of flexibility at the handle, so that the comb, will neither knot with or roughly engage the hair, and if tending to do so, will be elastically withdrawn from engagement with the hair.

On completion of the shedding operation, the device may be turned over so that the straight te.the be immediately used thereby more easily effecting the grooming of the animal, all before the electro static charge on the hair has lessened or the animals hair has rematted or reknotted.

In addition to facilitating the removal of the loose hair, the electro-static field created by the plastic material forming the comb, enables the comb to separate dirt and dandruff from the hair, raising such dirt and dandruff to the surface hair and permits this dirt and dandruff to be easily removed either simultaneously with the removal of the shedding or during the ultimate combing with the straight teeth.

The straight teeth comb edge further provides a smooth lay down of the hair, resulting in a more shining, smooth and glossy coat.

Full details of the present invention are set forth in the following description, and are illustrated in the accompanying drawings.

BRIEF DESCRIPTION OF THE DRAWINGS

FIG. 1 is a perspective view of the device in flat condition;

FIG. 2 is an enlarged partial view of the band device as shown in FIG. 1;

FIG. 3 is the device assembled for use, and;

FIG. 4 is an enlarged section of the handle members showing the interlocking portions thereof.

DESCRIPTION OF THE INVENTION

As seen in the drawings, the combined shedding and grooming comb of the present invention, generally depicted by the numeral 10, comprises an elongated band or strip 12 of a plastic material such as polypropylene, linear polyethylene, P.V.C. or any other plastic resin that will produce an electro-static charge when rubbed against a hairy body and be sufficiently flexible so as to be bent into the closed loop tear drop configuration shown in FIG. 3.

A series of uniform V-shaped teeth 14 are formed along one longitudinal edge of the strip 12. As seen in FIG. 2, each tooth 14 has a rounded outer point or tip 16 and a rounded base 18. Each base 18 meets with the adjacent tooth along a common base line 20. Along the opposite longitudinal edge of the strip 12, there is formed a series of uniform spaced straight teeth 22 arranged parallel to each other. As seen in FIG. 2, the straight teeth 22 also have rounded outer tips 24 and rounded bases 26 along a common base line 28.

In rounding the tips, 16 of the V-shaped teeth 14, as well as the tips 24 of the straight teeth 22, roundness both in the plane of the strip 12, as well as transversely to such plane (i.e in depth) is effected so as to produce a tip which is basically conical. Although the elongated strip 12 is on the whole flexible, the plastic material from which it is made, is sufficiently rigid so that the teeth 14 and 22 formed thereon, will not themselves be flexible or easily broken off.

Fixed integrally to each end 30 and 32 of the plastic strip 12 is a half handle member 34 and 36 respectively. Each of the half handle members 34 and 36 is basically identically shaped and sized to conform, as a mirror-image with the other. One of the half handle members, here illustrated as member 34, is provided with an integral hook member 38 directed inwardly while the opposite handle member 36 is provided with a U-shaped hasp receiving member 40 into which the hook member 38 fits. By placing the two half-handle members 34, and 36 in abutment with each other and slightly askew, the hook 38 can then be inserted into the receiving member 40 simply by sliding the two half handle members 34 and 36 relative to each other. Once the hook 38 enters into the receiving member 40, the two half members 34 and 36 meet and correspond with each other so as to provide a complete handle for use.

As seen in FIG. 3, the bending of the strip 12, produces a closed loop with one section A of the strip 12 lying opposite to and vertically parallel to a second section B, with the corresponding teeth 14 or 22 lying in a common plane. Thus, the comb 10 may be selectively used with either the shedding teeth 14 or the grooming teeth 22 and with two sets or rows A and B in simultaneous contact with the animal.

It will be noted from FIG. 1, that the ends 30 and 32 of the strip 12 are integrally attached to a respective one of the half handle members 34 and 36 so that the completed handle, formed by the engagement of the members 34 and 36, while forming a single device, is connected separably to each end of the strip. This provides and maintains a high degree of flexibility between the handle and the tear drop bent comb permitting the comb strip 12 to readily flex at the connecting ends 30 and 32. This allows both portions of each set of teeth 14 and 22 A and B formed when the strip 12 is bent into its tear drop shape, to engage the animal, and simultaneously shed or groom the animal. Should a momentary increase of friction occur, or should the comb knot with the hair, the flexibility, at the ends 30 and 32 will allow the comb to bend as a whole without hurting or injuring the animal. Thus, the present comb increases the speed at which the shedding and combing operation can be effected by allowing two rows of the same teeth to simultaneously traverse the animal.

Preferably, the handle members 34 and 36 are formed of the same plastic material as that used in the strip 12, and integrally molded with the strip 12, although other plastic materials, or even metal or wood handles may be used if desired.

The uniform V-shaped teeth 14 formed of plastic material, insures electro-static raising of the hair and effective easy combing of the shedded hair, while smooth uniform formation of both the shedding and grooming teeth 14 and 22 without ragged edges, avoids skin tearing. The placement of the bases 18 and 28 of all of the V-shaped teeth 14 and straight teeth 22 respectively along common base lines 20 and 28, insures uniform combing and avoids uneven tearing no matter which sides of the comb is used.

Various modifications and changes have been suggested herein and others will be obvious to those skilled in the art. It is intended therefore, that the present disclosure be taken as illustrative only and not as limiting of the present invention.

What is claimed is:

1. A comb for grooming animals comprising an elongated flexible strip of plastic material bendable into a tear-drop shape, and having a handle member at each end, each of said handle members being integrally formed with said strip to be substantially mirror images of each other, and having exterior and interior surfaces, one of said handles being formed on its interior surface with latch receiving means and the other of said handles being formed on its interior surface with a latch, said members being engageable with their interior surfaces in sliding contact so that said latch is removably inserted in the latch receiving means to hold said handle members together, said strip being formed along one edge with uniformly shaped and spaced V-shaped teeth having tip and bases rounded in the plane of said strip and transverse to the plane of said strip, and along its opposite edge with uniformaly shaped and spaced straight teeth parallel to each other said straight teeth having rounded tops and rounded bases, said bases meeting along a common line, said strip generating an electrostatic charge in the hair of the animal causing the hair to stand straight and raise dirt, loose hair and other impurities from the skin of the animal for easy removal.

2. The device according to claim 1, wherein said latch is a hook and said latch receiving means is a hasp for receiving said hook.

* * * * *